United States Patent [19]
Storrar

[11] Patent Number: 6,032,528
[45] Date of Patent: Mar. 7, 2000

[54] FLOW METER HAVING CYLINDERS WITH FREELY MOVABLE PISTONS THEREIN

[76] Inventor: Andrew Martin Storrar, 20B Windsor Park, Belfast, United Kingdom, BT9 6FR

[21] Appl. No.: 09/143,750

[22] Filed: Aug. 31, 1998

Related U.S. Application Data

[63] Continuation-in-part of application No. 08/727,661, filed as application No. PCT/GB95/00813, Apr. 10, 1995, abandoned.

[30] Foreign Application Priority Data

Apr. 9, 1994 [GB] United Kingdom .................. 9407079

[51] Int. Cl.⁷ ...................................................... G01F 3/06
[52] U.S. Cl. .............................................. 73/252; 73/249
[58] Field of Search ............................ 73/239, 240, 242, 73/243, 247, 248, 249, 252

[56] References Cited

U.S. PATENT DOCUMENTS

| | | |
|---|---|---|
| 2,127,773 | 8/1938 | Horton . |
| 2,724,970 | 11/1955 | Risser, Jr. . |
| 3,757,581 | 9/1973 | Mankin et al. . |
| 3,916,931 | 11/1975 | Shaw et al. ................................ 73/249 |
| 4,192,185 | 3/1980 | Keilholz ..................................... 73/249 |
| 4,938,054 | 7/1990 | Dye et al. .................................. 73/247 |

*Primary Examiner*—Harshad Patel
*Attorney, Agent, or Firm*—Mark A. Oathout

[57] ABSTRACT

The invention relates to a flow meter and in particular to a flow meter suitable for connection into a fluid conduit. The flow meter has an inlet and an outlet for connection into a fluid line and includes interconnected cylinders, each cylinder having a plurality of ports controlled by a piston axially-movable therein such that at any time the inlet and outlet are in fluid communication by a fluid pathway which includes two cylinders characterized in that there are three interconnected cylinders.

17 Claims, 10 Drawing Sheets

FLOW METER HAVING CYLINDERS WITH FREELY MOVABLE PISTONS THEREIN

This application is a continuation in part of U.S. application Ser. No. 08/727,661, abandoned; which is a §371 of International application no. PCT/GB95/00813 filed Apr. 10, 1995; which is based on foreign application no. Great Britain 9407079.4 filed Apr. 9, 1994.

This invention relates to a flow meter and in particular to a flow meter suitable for connection into a fluid conduit.

The fluid to be metered may be liquid or gaseous, so that for instance the flow meter can be connected into a water or gas conduit to provide a measuring system to meter the respective flow volume into a dwelling or factory; the meter can be also fitted into a suitable outflow.

BACKGROUND OF THE INVENTION

Flow meters for public use are required in many countries to meet specified accuracy standards.

In the United Kingdom the relevant British Standard 5728 (amendment 1-1985) Class D requires domestic water meters to record from a starting flow rate of 0.00375 cubic meters per hour; to respond to a minimum flow rate of 0.0075 cubic meters per hour, and above which accuracy is to be within +/−5%; through a transition flow rate 0.0115 cubic meters per hour above which the accuracy is to be within +/−2%, to a maximum flow rate of 2.0 cubic meters per hour. Turndown (the ratio between the maximum and minimum flow rates to be recorded) is thus 267:1.

The specified U.K. pressure drop is to be no more than 0.25 bar at the nominal flow rate, and no more than 1.0 bar at the maximum flow rate.

The U.K. domestic water pipework is of internal diameter 15 mm +/−1 mm, so that at minimum and maximum flow rates the mean water velocities are 0.012 m/s and 3.14 m/s; since the corresponding Reynolds numbers at ambient conditions are 135 and 36,000 the flow goes from laminar to turbulent over the flow range.

A water meter suitable for widespread industrial and domestic fitting could lead to a substantial reduction in water demand as users become more careful to control waste, with a reduction in the facilities needed by the water authorities for processing and storage.

DISCLOSURE OF THE PRIOR ART

Flow meters are in current use, but utilising a so-called rotary piston. Such flow meters comprise a cylindrical measurement chamber with a partition plate separating the inlet port from the outlet port. The piston is also cylindrical, and is guided in the measurement chamber for oscillatory motion between an inner and an outer boss, by the engagement of the partition plate with a slot in the piston.

The rotary flow meter relies on entrapping a fixed quantity of water (or other fluid) both inside and outside the piston during each revolution. For accurate metering the resulting rotational velocity of the piston needs to be proportional to the rate of fluid flow over the turndown, i.e. including at the minimum and at the maximum flow rates. Such accurate metering depends on low internal leakage, but this has long proved difficult to achieve because the leak paths (determined by the rounded geometry) are short in length though wide in breadth. Also close manufacturing tolerances are required; and yet mechanical friction should be kept low, notwithstanding the need for close fits to reduce leakage, for instance between the outer diameter of the piston and the adjacent inner diameter of the measuring chamber.

Often even the most costly and complicated of current rotary type water meters fail to meet the above-mentioned Class D standard.

We have previously proposed a flow meter comprising reciprocable pistons. Though positive displacement, the pistons are not positively sealed against cylinder internal leakage and are free to move in response to hydraulic pressures. The pistons are "double-acting", acting similarly in both directions of movement along a cylinder (as a respective control piston for an operating piston). The control piston connects the inlet and outlet, the said another piston being a movable operating piston adapted at its one end to be driven by fluid from the inlet and at its other end to discharge fluid to the outlet i.e. with positive fluid displacement. This arrangement permits flow monitoring by the sensing of the axial movement (or position) of a piston i.e. rather than the sensing of a rotational piston movement (or position). Treat flow meter is more fully disclosed for instance in our U.S. Pat. No. 4,993,262 the disclosure of which is incorporated herein by reference. There are two pistons, each double-acting, and each being successively the control piston and the operating piston.

Advantages of that two-piston flow meter are its high accuracy, relatively low cost, and dual-direction flow metering. There are however possible limitations on its utility mitigating against widespread adoption. Thus the facility for dual flow direction metering (for monitoring both forwards or backwards water flow) whilst leaving the advantage of perhaps simplifying installation where access was difficult could in other situations be a disadvantage, requiring for instance a one-way valve to be fitted downstream e.g. in conduits subject to intermittent high back pressures, perhaps of contaminated fluid. Furthermore, because of the use of "free" pistons, at the very lowest flow rates internal leakage across the operating piston central land could perhaps cause the operating piston to "short-stroke", by causing its control piston to move prematurely and so cutting off its port controlling flow to or from the operating piston, with incorrect customer charging if metering is based on counting the number of piston strokes, or flow meter cycles; this effect might only become apparent when the pistons have "worn in" and frictional resistance to piston movement reduced. Also, because the control piston is stationary (or nearly so) for only half the flow meter cycle, at the very highest flow rates each piston is being worked hard, with considerable wear and perhaps setting an upper limit to the flow rate which can be measured without a substantial increase in meter size.

We are aware of U.S. Pat. No. 3,757,581, U.S. Pat. No. 2,127,773, FR-A-400,742, FR-E-11,795 and U.S. Pat. No. 2,724,970 but none of these disclose the use of free pistons. U.S. Pat. No. 3,757,582 teaches pistons interconnected by a conrod to a crankshaft. U.S. Pat. No. 2,127,773 teaches pistons interconnected by a swash-plate ("wobble plate") device. FR-A-400,742 and FR-E-11,795 teach the use of only one measuring piston, with the remaining pistons (merely) being distributors. U.S. Pat. No. 2,724,970 has pistons interconnected by an operating (swash) plate, and has mechanical valve operating means.

We have become aware of a lubricant dispenser using three reciprocating free pistons; a disclosure occurs in FIG. 2 on Page 181 of "Handbook of Fluid Flow Metering" C. J. Barnard 1988 (Trade and Technical Press, ISBN 85461-120-7). The flow through each "transfer" port (for transferring flow from one cylinder to another) is restricted to one way flow, and thus the port is single function. Another disadvantage of that arrangement is that the "inlet" and "outlet" ports for each cylinder are diametrically opposite transfer ports (leading to or from another cylinder), with (a) a need for accurate relative placement to ensure simultaneous opening/ closing so as to avoid a reduction in the available (cross-sectional) flow area, (b) unequal forces on the piston, pushing it away from the inlet, increasing wear and increasing frictional resistance to piston movement and so setting a lower threshold inlet pressure before the dispenser will operate, and (c) an increased likelihood of internal leakage due to the increased hydrodynamic pressure drop across a port, this pressure drop increasing with flow rate and piston speed and setting an upper threshold for the inlet pressure. Thus that meter was designed (only) for slow moving viscous and lubricating liquids.

DISCLOSURE OF THE INVENTION

We now seek to provide a flow meter overcoming or reducing these disadvantages, specifically a flowmeter suited to responding accurately both to low and high flow rates; we also provide a flow measuring system using the flow meter in a fluid line, with means responding to piston position so as to permit calculation of fluid flow through the flowmeter.

For our earlier arrangement we have considered increasing the frictional resistance to piston movement, so as to hold the (stationary) control piston against movement until the second of the two pistons completes its stroke, and we have also considered providing a lip seal for the central port; both of these possible solutions to "central or inlet port leakage" introduce however further problems Alternatively therefore we now propose a flow meter of special design, with at least three interconnected cylinders and using free pistons. Thus according to one feature of our invention ire provide a flow meter having an inlet and an outlet for connection into a fluid line and comprising three interconnected cylinders, each cylinder having a plurality of ports controlled by a free piston axially-movable therein by fluid flow from the inlet and such that at any time the inlet and outlet are in fluid communication by a fluid pathway which includes two of the cylinders, characterised in that upon piston movement in a cylinder two ports of that cylinder are alternately connected to the inlet and to the outlet.

Flow of operating fluid to the operating cylinder occurs between axially spaced ports of the control cylinder, with a flow path within the control cylinder being provided by a reduced diameter portion of the control piston. Similarly fluid consequentially displaced by the operating piston is discharged to outlet by way of other axially spaced ports of the control cylinder, with a flow path within the cylinder being provided by another reduced diameter portion of the control piston. The axially spaced ports can be annular.

Notwithstanding the provision of a third cylinder there is provided continuous fluid communication throughout a flow meter cycle between the inlet and outlet, and so we provide a flow measuring system using a flow meter according to the invention in an hydraulic circuit, the flow meter including pistons able to stroke in respective hydraulic cylinders, the cylinders each having hydraulic inlet and outlet port means so arranged with respect to the respective pistons that an inlet port and an outlet port are in hydraulic communication during piston stroking so that flow along the conduit can be continuous, there being at least three cylinders, an inlet and an outlet port in a cylinder being arranged so that they are in hydraulic communication by way of the piston in another cylinder, and including means to determine the number of strokes of a piston in a specified time (or for sensing movement of a piston to measure flow of the fluid).

The invention will be further understood by reference to the appended claims, but the invention also discloses that the respective two cylinders providing the fluid communication between inlet and outlet change in predetermined succession during a flow meter cycle, being for example successively pistons one and two, pistons two and three, and pistons three and one. During that part of the flow meter cycle during which a particular piston pair is active, the first of said pistons is stationary, or substantially so, whilst the second is moving, driven by inlet fluid at its one end and driving out fluid from its other end; such expelled fluid is from a previous part of the cycle and is driven towards the outlet past the first piston.

During a flow meter cycle each piston is successively the stationary control piston for another piston, the moving operating piston and the standby piston. The volume of inlet fluid received at one end of the moving piston equates substantially to the volume expelled by its other end.

Preferably the pistons act similarly for each direction of their axial movement between the ends of their cylinder i.e. they are double acting; thus the flow meter is self-resetting, for repeated cycling. The pistons are designed to move along their cylinder without substantial constraint i.e. they are freely slidable without significant frictional resistance frog the cylinder walls, and preferably float in the flow medium, being driven by hydraulic rather than mechanical pressure.

The cylinders may be housed in a three-part body comprising a central body part and two end parts. Desirably the cylinders are flow connected internally of the body, with flow passageway portions formed in both end parts or manifolds, and in the outer wall (preferably annular) of the central body part.

Usefully the ports in the walls of each cylinder are similarly configured, but this need not be so. The ports controlling the phasing of the flow may be either the cylinder inlet ports or the cylinder outlet ports.

The inlet and outlet can have controlled interconnection by the pistons and portings being arranged to permit flow from the inlet to the outlet but restricting reverse flow from the outlet to the inlet whereby a separate one-way reverse-flow control valve is not needed.

Desirably the flow meter has sensing means able to check the presence (or absence) of one of the pistons at a selected end of its cylinder whereby to determine the flow or flow rate of fluid between the inlet and outlet i.e. along the line into which the flow meter is inserted. Preferably the sensing means uses pulsed signals to minimise power consumption, provided by a dedicated battery or public utility. The sensing means may be inbuilt, or attachable to the flow meter as one of a plug and socket combination.

Thus we further provide a flaw measuring system which comprises a three piston flow meter, a sensor carried by the flow meter for detecting the presence of a piston, and calculator means to convert sensor responses into one of the flow rate or the flow volume of fluid flow through the meter.

Each piston will have cylindrical end piston portions, a cylindrical intermediate piston portion, and transfer flow means connecting the end piston portions to the intermediate piston portion, whereby each piston of said first and second cylinder arrangements acts, for its respective cylinder section as a valve operator means. There is a third cylinder section, also having a respective piston freely slidable therein; the bi-directional valve ports of the first cylinder section communicate with ports in the respective ends of the third cylinder section. The three pistons move in succession between the said end positions.

The transfer flow means can be respective piston shaft portions permitting flow therearound.

The provision of a third piston with one piston at current standby can permit a reduction in the length of the central lands, and an increase in the length of the central control port of for instance 1 mm to 2.25 mm, yet avoiding the problems of internal leakage across a respective central land, whereby to achieve full piston stroking, consistently, at low flow rates; manufacture can be eased, and internal pressure drops kept low. Alternatively piston diameter can be reduced whilst retaining the ports at the "two-piston" area.

BRIEF DESCRIPTION OF THE DRAWINGS

The invention will be further described by way of example with reference to the accompanying drawings, in which.

DESCRIPTION OF EXEMPLARY EMBODIMENTS

Figure 1:
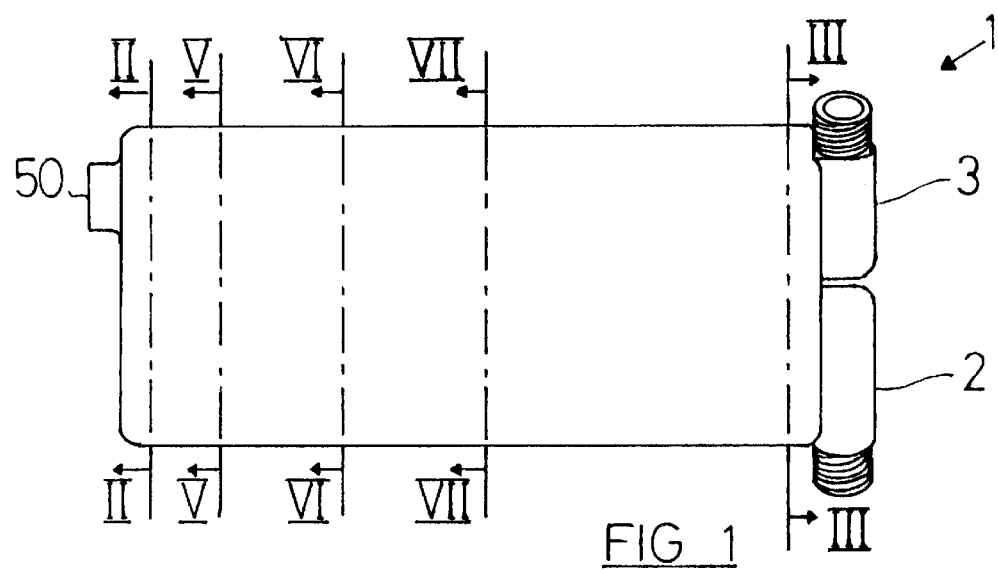
FIG. 1 is a side elevation of a flow meter according to the invention.
Figure 17:
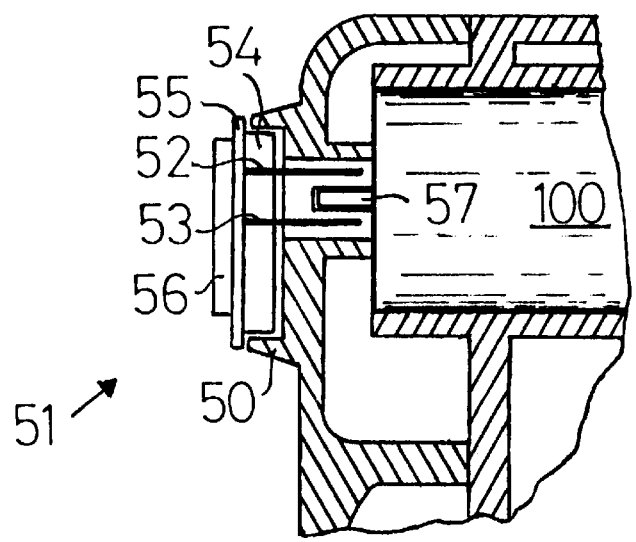
FIG. 17 is a schematic sectional view of a sensing device for monitoring an end position of a piston.

The flow meter 1 is designed to respond to water flow along a conduit (not shown). There is a provision (in the embodiment of FIG. 1 by end socket 50) for the fitment of a recording device 51 (FIG. 17) for logging the flow meter response, to permit monitoring of the volume of water which passes through the flow meter and thus along the conduit; with the recording device fitted, the flow meter can be used for instance to check the volume of water used by a customer (perhaps for customer billing) or the volume of water used in an industrial process (perhaps for quality control), with the logging being local to the flow meter or transmitted to a distant location.

For domestic applications and anticipated flow rates the flow meter 1 will have a diameter of 15 cm or below (typically 1 cm) and a length of 25 cm or below (typically 17 cm), the lowest size achievable being in part determined however by internal pressure drops (which increase inversely as the fourth power of diameter).

Figure 4:
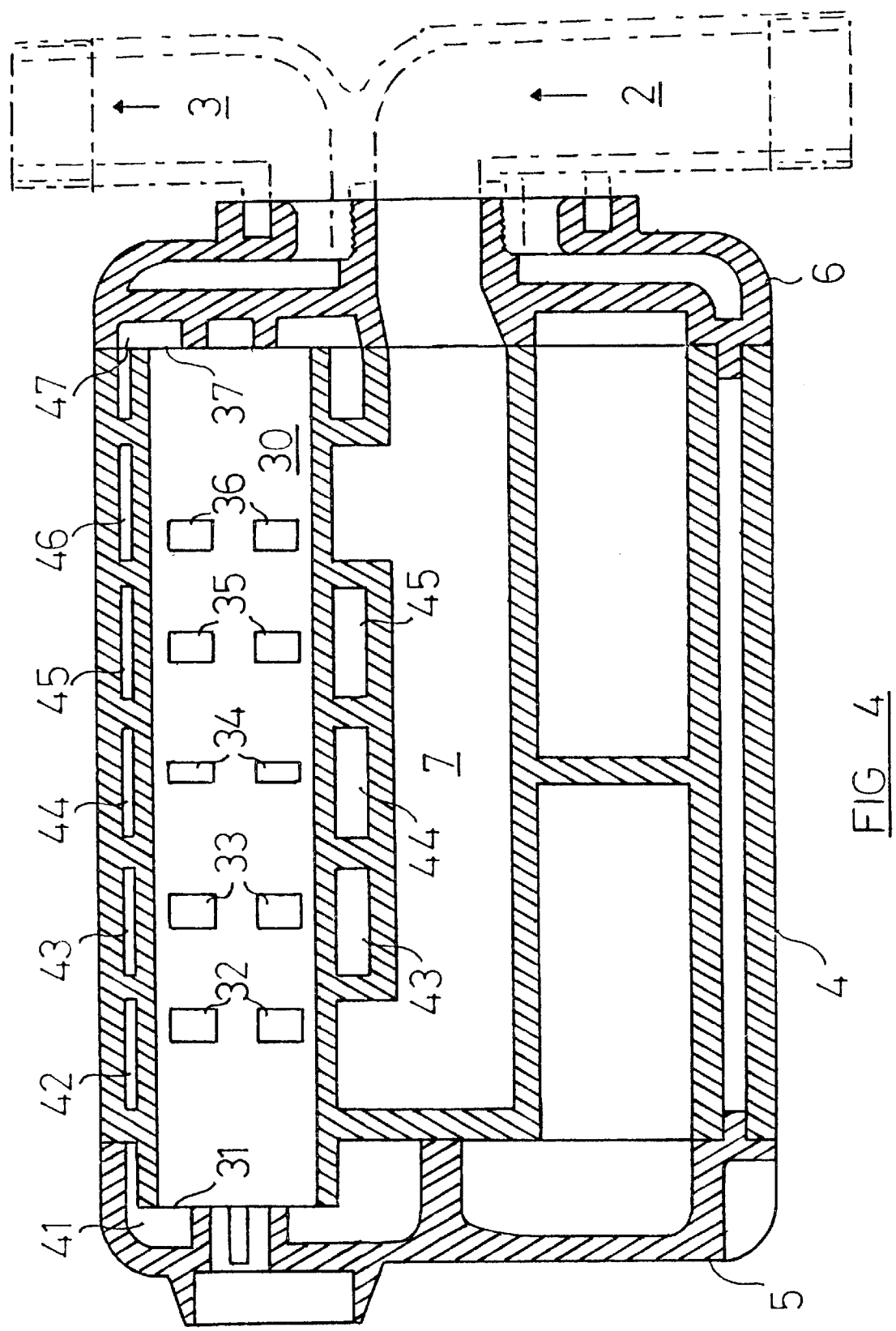
FIG. 4 is a central section on the flow meter of FIG. 1; with the inlet and outlet couplings shown in dotted outline.

The flow meter 1 can be connected into the specified conduit using inlet coupling 2 and outlet coupling 3. Usefully the inlet and outlet couplings are threaded at both ends, and can either be separate components or as seen in FIG. 4 can be combined into a unitary member, in both cases as an end connection to concentric inlet and outlet channels (FIG. 4). In an alternative embodiment the couplings can be a side connection mid-way along the length of the flow meter, and in another alternative embodiment the inlet coupling can be at one end of the meter and the outlet coupling at the other end.

As more clearly seen in FIG. 4 the flow meter 1 has a central body part 4, and end body parts 5, 6. The end body parts can be welded to the central body part, or can be otherwise sealingly coupled thereto as by tie bars.

Figure 2:
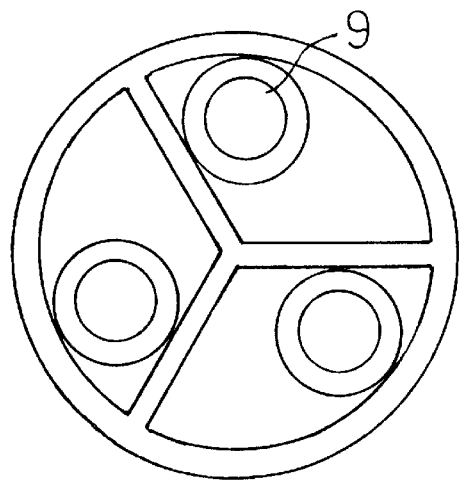
FIG. 2 is a view on line II–II of FIG. 1.
Figure 3:
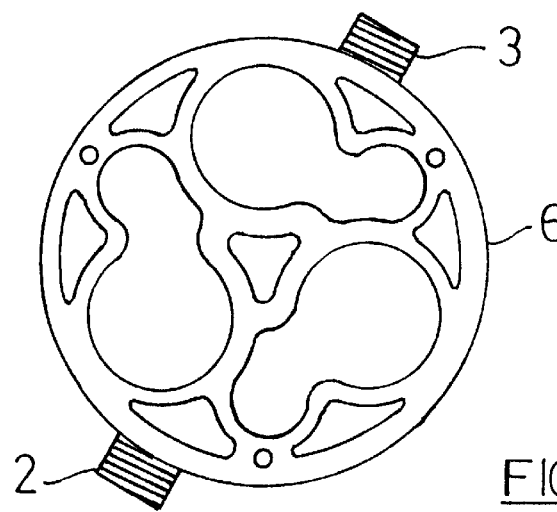
FIG. 3 is a view on the line III–III of FIG. 1.

The central body part 4 has three axially extending cylinders 10, 20, 30 (FIGS. 5–7), equilaterally spaced about the longitudinal axis of the central body part 4, and in this embodiment of bore 2.8 cm; at opposite cylinder ends are piston end stops 9 (FIG. 2), determining for each piston its full stroke length. In an alternative embodiment the cylinders can include a sealed liner of a different material to that of the body part 4. Each cylinder is adapted to receive a respective piston 100, 200, 300 (FIG. 8), each piston being of the same outer diameter and each with two parts of reduced section i.e. 101, 102; 201, 202; and 301, 302; for a purpose to be described below. In this embodiment each piston has a stroke of 2.0 cm. The meter materials of this embodiment are selected to accommodate river and underground derived waters in the pH range 6.9 to 8.5, preferably an even wider pH range, whilst continuing to meet the Class D standard.

There are seven internal passageways for each respective cylinder, formed usefully by a lost wax or lost metal process; these passageways are axially-spaced along the length of each cylinder. These comprise two end passageways 41 and 47 formed in conjunction with respective end body parts 5, 6; and five intermediate passageways 42, 43, 44, 45 and 46.

Each intermediate passageway has associated therewith a number of inwardly directed branches which break through the cylinder wall to provide corresponding flow ports. Thus, cylinder 30 has end flow ports 31 and 37, and side flow ports 32, 33, 34, 35 and 36; the ports 32 are connected to passageway 42, the ports 33 are connected to passageway 43 and so on. Similarly, and as indicated schematically in FIG. 9, cylinder 10 has end flow ports 11 and 17, and side flow ports 12, 13, 14, 15 and 16; cylinder 20 has end flow ports 21 and 27, and side flow ports 22, 23, 24, 25 and 26.

In this embodiment corresponding ports are of identical shape and cross-section, and disposition along the respective cylinder, but though preferable this need not be so.

The size of the passageways, and the size and disposition of the branches and ports, will preferably be chosen to minimise hydraulic pressure drop. As more particularly seen in FIG. 4, the passageways 43, 44 and 45 are of larger cross-section adjacent the central axis of the flow meter i.e. where there is a larger volume of water flow to be accommodated than at the outer periphery when much of the water has already left the passageway and entered into the cylinder (through a branch and port).

The arrangement for the water flow to enter a cylinder from an intermediate passageway 43, 44 or 45 through a number of circumferentially spaced side flow ports (i.e. spaced around the cylinder longitudinal axis) as seen in FIG.

4 through grouped side flow ports, helps to provide a balanced water flow, not only into but just as importantly out of the respective cylinder; it furthermore encourages the respective piston to "float" centrally in the cylinder (rather than being biassed by a single water inflow jet against the cylinder opposed wall portion) and so helps reduce sliding friction during axial traverse of a piston along its cylinder.

Figure 5:
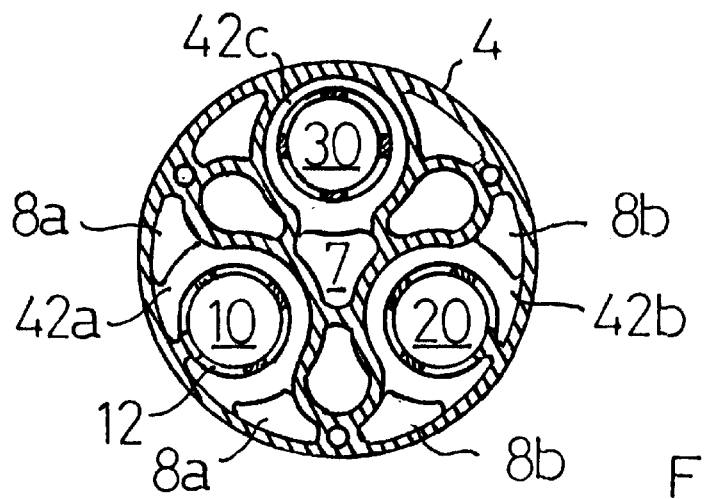
FIG. 5 is a section on the line V–V of FIG. 1.
Figure 6:
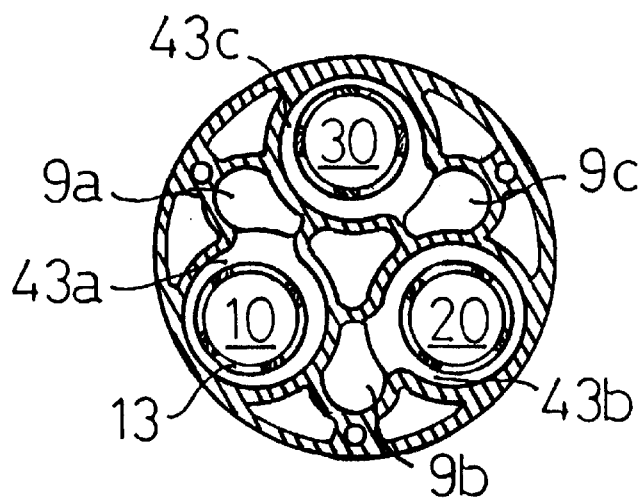
FIG. 6 is a section on the line VI–VI of FIG. 1.
Figure 7:
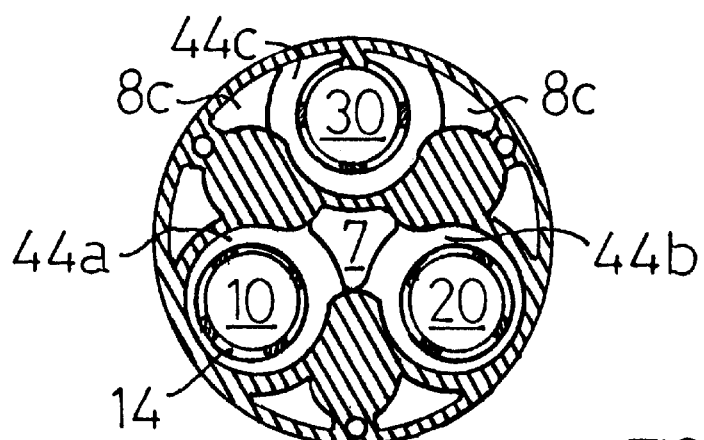
FIG. 7 is a section on the line VII–VII of FIG. 1.

The sectional views of FIG. 5, FIG. 6 and FIG. 7 show the intermediate porting at the specified position along the cylinders. For simplicity in these figures, the passageways 42, 43 and 44, the outlet channels 8 and the transfer channels 9 are given the suffix a, b or c, according to whether they relate to cylinder 10, 20 or 30 respectively.

It will be seen from FIG. 5 that cylinders 10 and 20 are open (via passageways 42a, 42b) to respective outlet channel. 8a, 8b, which communicate with outlet coupling 3, whilst cylinder 30 is open (via passageway 42c) to the (generally triangular) central inlet channel 7, which communicates with inlet coupling 2.

It will be seen from FIG. 6 that all three cylinders 10, 20, 30 are open (via passageways 43a, 43b, 43c) to the (generally pear shaped) transfer channels 9a, b, c respectively.

It will be seen from FIG. 7 that cylinders 10 and 20 are open (via passageways 44a, 44b) to the inlet channel 7 whilst cylinder 30 is open (via passageway 44c) to the outlet: channels 8c.

To assist the floating action each piston is fabricated so as to have a specific gravity similar to that of water, or if the flow of another liquid is being monitored to have the specific gravity of that liquid, and thus preferably has neutral buoyancy. Suitably the pistons may be hollow, and in one embodiment comprise two half-shells welded together along an axially extending plane at the outer periphery and also at internal strengthening walls or partitions.

To help reduce impact wear and noise for liquid flow measuring applications, each cylinder end part can be designed to provide an hydraulic brake (but not an hydraulic stop). In particular the size and shape of the passageways 41, 47 formed in one or both of the end body parts 5, 6 can be selected so as to cooperate with an approaching piston to provide a pre-determined resistance requiring forced hydraulic outflow for continued piston movement, until further movement is prevented by a piston end stop 9.

In a preferred embodiment a progressively greater resistance to hydraulic flow can be used, such that a piston approaching at or near its maximum speed (maximum flow rate) meets the highest resistance and is also therefore brought to rest or nearly so before abutting the end body part. Thus damage to the piston and/or end body part, and impact noise during operation of the meter, are reduced.

Figure 8:
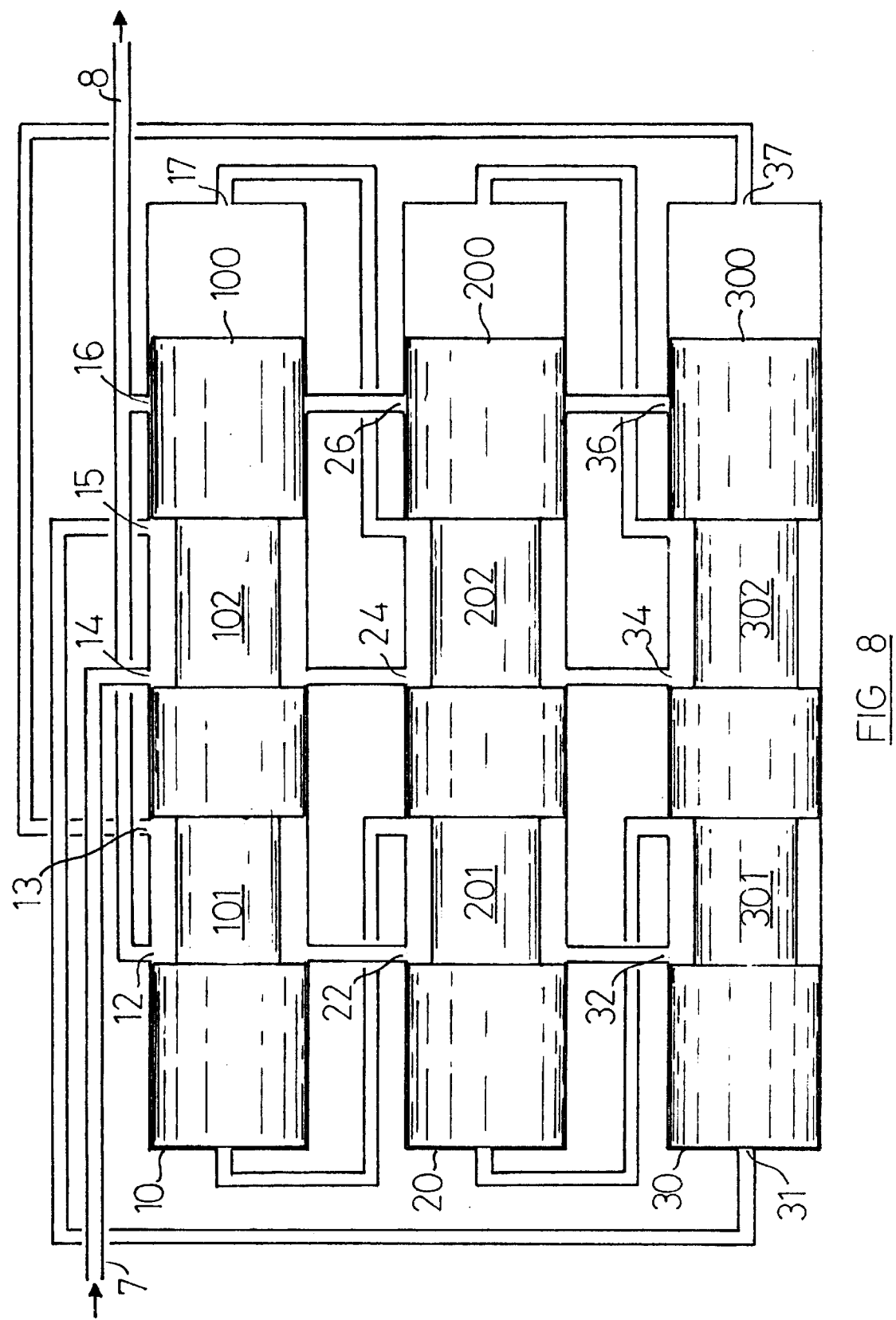
FIG. 8 is a schematic developed view of the piston and cylinder arrangement of the flow meter, with the cylinders connected by "forward" porting.

In the developed schematic porting arrangement of FIG. 8 the inlet channel 7 is connected to ports 14, 24, and 34. For clarity only a single respective port is shown, though preferably the inlet will connect to multiple (circumferentially spaced) ports by way of passageways 44 and respective inwardly directed branches, as described above with reference to FIG. 4.

The outlet 8 is connected to ports 12, 16; 22, 26; and 32, 36, again for clarity shown as a respective single port; preferably however the outlet will again connect to multiple (circumferentially spaced) ports by way of passageways 42, 46 and respective inwardly directed branches.

It will be observed that in the FIG. 8 ("forward" porting) embodiment the transfer channel connecting ports 31 and 15 needs to cross the transfer channel connecting ports 37 and 13. It has been found that this can add to the manufacturing complication if desire ably these lines are internal of the flow meter body; thus the functioning of the flow meter of the invention will be described in relation to an alternative ("mixed") porting embodiment with particular reference to the subsequent showings of FIGS. 10–16 and which relate to the FIGS. 1–7 and FIG. 9 arrangement.

Other than this possible manufacturing complication arising with the FIG. 8 line connections, not present of course if external lines are used (since the problem of providing transfer lines which cross internally of the meter body is not present, or alternatively that the problem of providing such crossing without a significantly increased pressure drop is not present), the two meter designs are equivalent in improved performance and suitability for domestic and commercial applications. In particular the cylinders and pistons are identical for the two embodiments, differing only in the interconnections between some of the ports.

Figure 9:
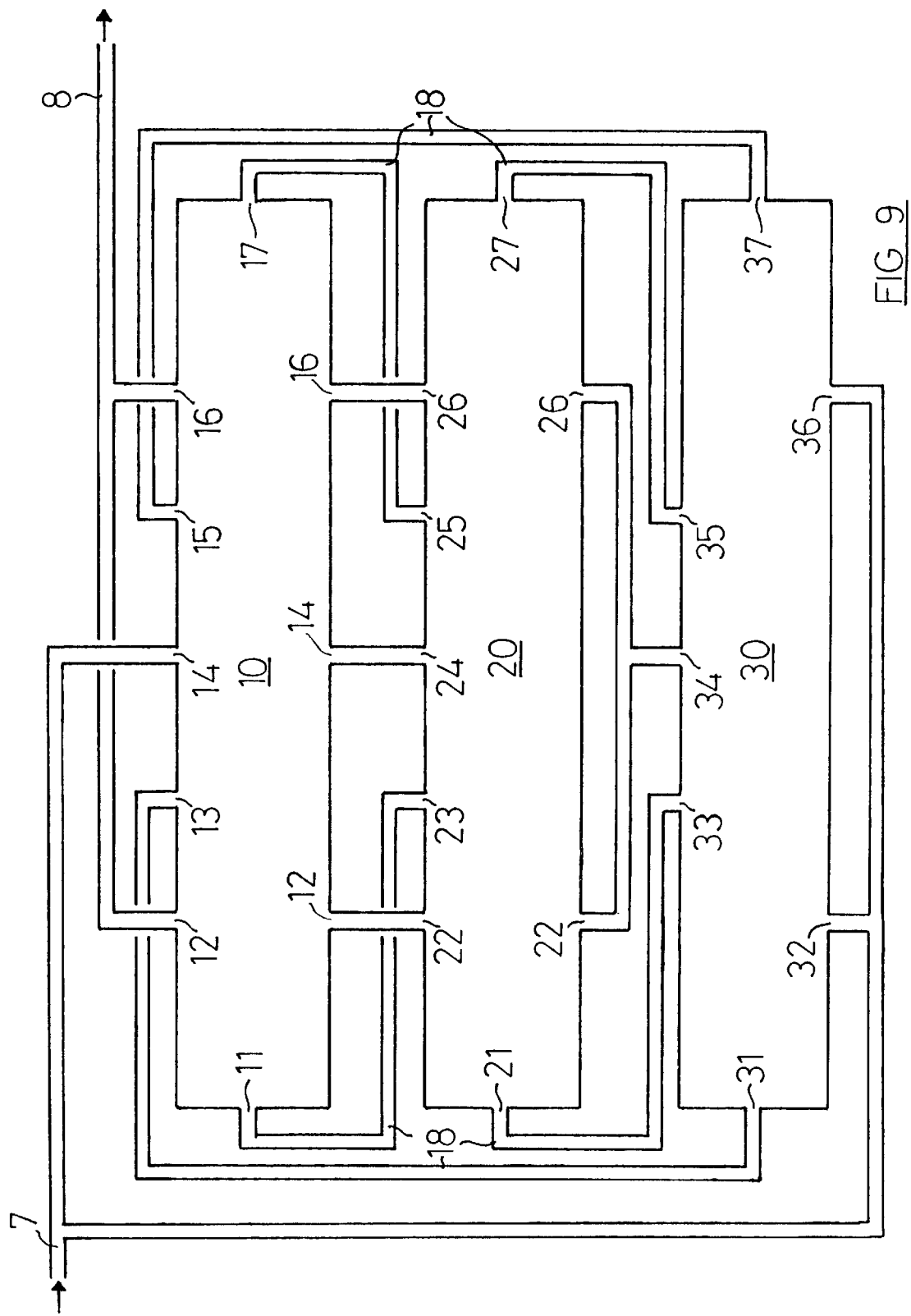
FIG. 9 is a schematic view of the cylinders similar to that of FIG. 8, but with the cylinders connected by "mixed" porting, as in FIGS. 1–7.

Referring therefore to FIG. 9, inlet channel 7 is connected to port 14 of cylinder 10, to port 24 of cylinder 20, and to ports 32 and 36 of cylinder 30. Outlet channel 8 is connected to ports 12 and 16 of cylinder 10, to ports 22 and 26 of cylinder 20, and to port 34 of cylinder 30.

In addition transfer lines 18 respectively connect the ports 11, 23; 21, 33; 31, 13; as well as 17, 25; 27, 35: 37, 15.

Whilst for drawing simplicity, port 34 is shown connected to outlet 8 only via cylinders 20 and 10, it will be understood that whilst the port is connected to those cylinders by way of transfer lines, it is also directly connected to outlet channel 8 (see FIG. 7), i.e. the positions of the pistons 100 and 200 do not affect the ability of fluid to flow from port 34 to outlet channel 8. Likewise, inlet channel 7 connects directly to port 14 and 24 (see FIG. 7); the position of piston 100 does not affect the ability of fluid to flow from inlet channel 7 into port 24.

Figure 10:
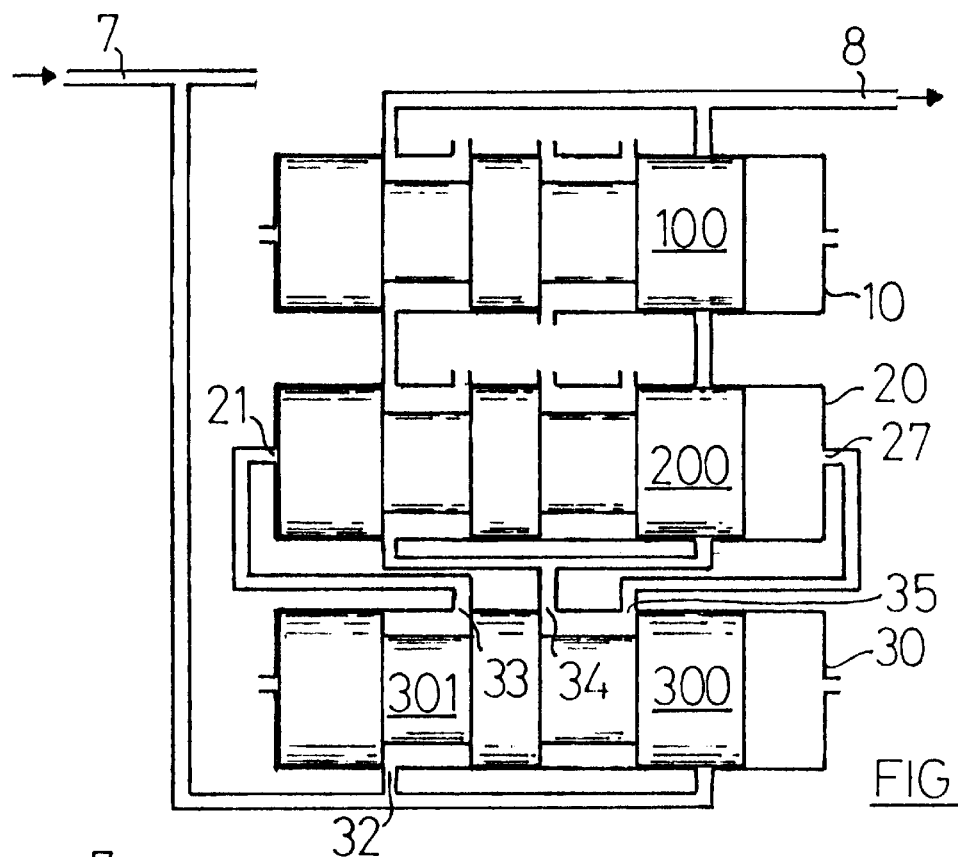
FIG. 10–15 are schematic views showing successive positions of the three pistons of the FIG. 1; embodiment during a flow meter cycle.
Figure 16:
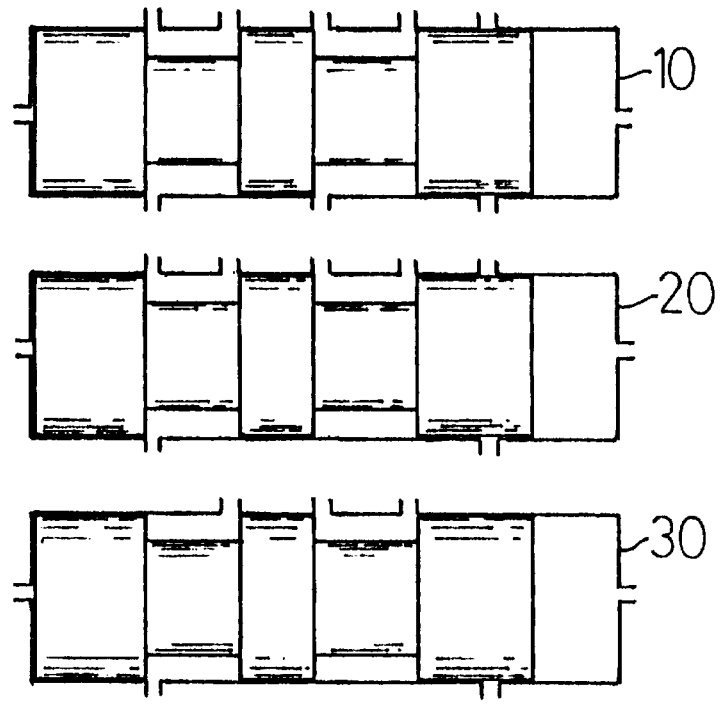
FIG. 16 is a schematic view corresponding to FIG. 10, showing the start of another flow meter cycle.

Whilst any start position can be selected, the presumed start position is with each piston at the left hand end of its cylinder, as viewed in FIG. 10 (and in FIG. 16).

In describing the operation of the meter as shown in FIGS. 10–16, for clarity only those channels through which flow can take place are drawn; it will be understood, with reference to FIG. 9, that there is no flow through the channels which are not drawn, though the pressure of water in those channels may act to prevent movement of the stationary pistons.

Figure 11:
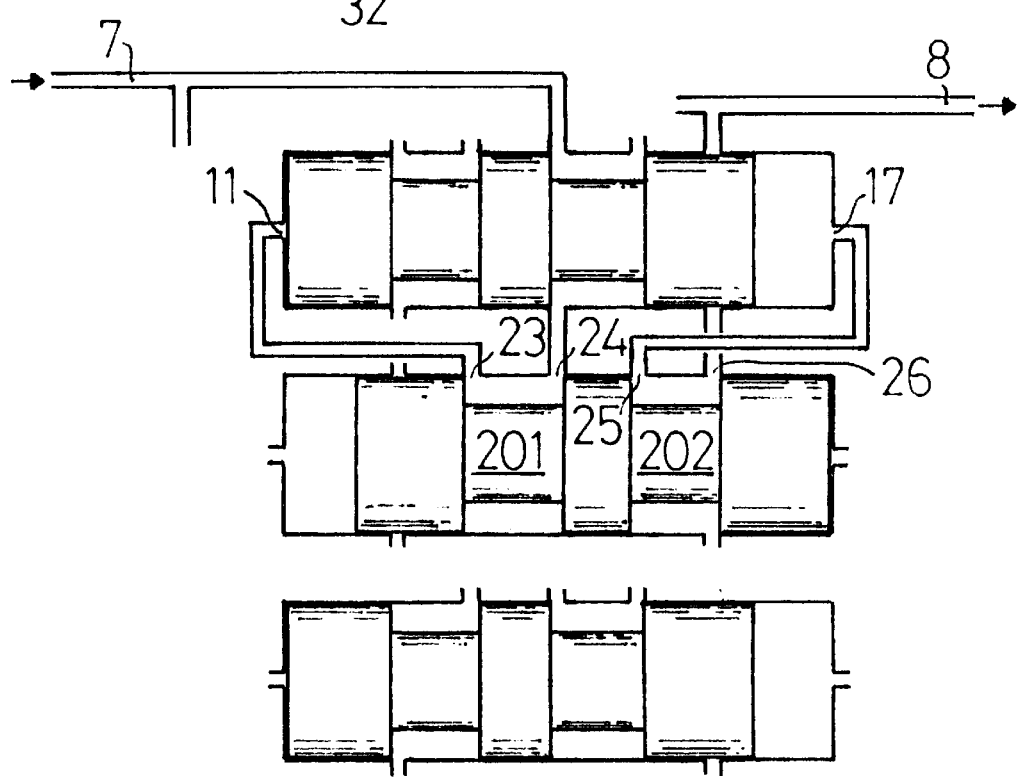

In operation, inlet flow through port 32 (having first passed along and/or around the reduced section part 301 of piston 300) will outflow through port 33 and enter the left hand end of cylinder 20 i.e. through port 21, whereby to move piston 200 to the right i.e. to the position shown in FIG. 11.

The fluid displaced from the right hand end of cylinder 20 exits through port 27 and enters cylinder 30 through port 35. This fluid exits cylinder 30 through port 34, and via the passageway 44c (see FIG. 7), passes to outlet channel 8.

When piston 200 reaches the right hand end of cylinder 20 its movement is arrested notwithstanding that the inlet pressure is still being applied through port 21. However this movement of piston 200 has connected ports 23 and 24, allowing inlet flow from port 24 (via passageway 44b (FIG. 7) and along and/or around reduced section piston part 201) to flow to the left-hand end of cylinder 10 where it passes through port 11 to move piston 100 to the right, until the pistons have the positions shown in FIG. 12.

The fluid displaced from the right hand end of cylinder 10 exits through port 17 and enters cylinder 20 through port 25.

This fluid exits cylinder 20 through port 26, and via the passageway 46b (similar to passageway 42b of FIG. 5), passes to outlet channel 8.

Figure 12:
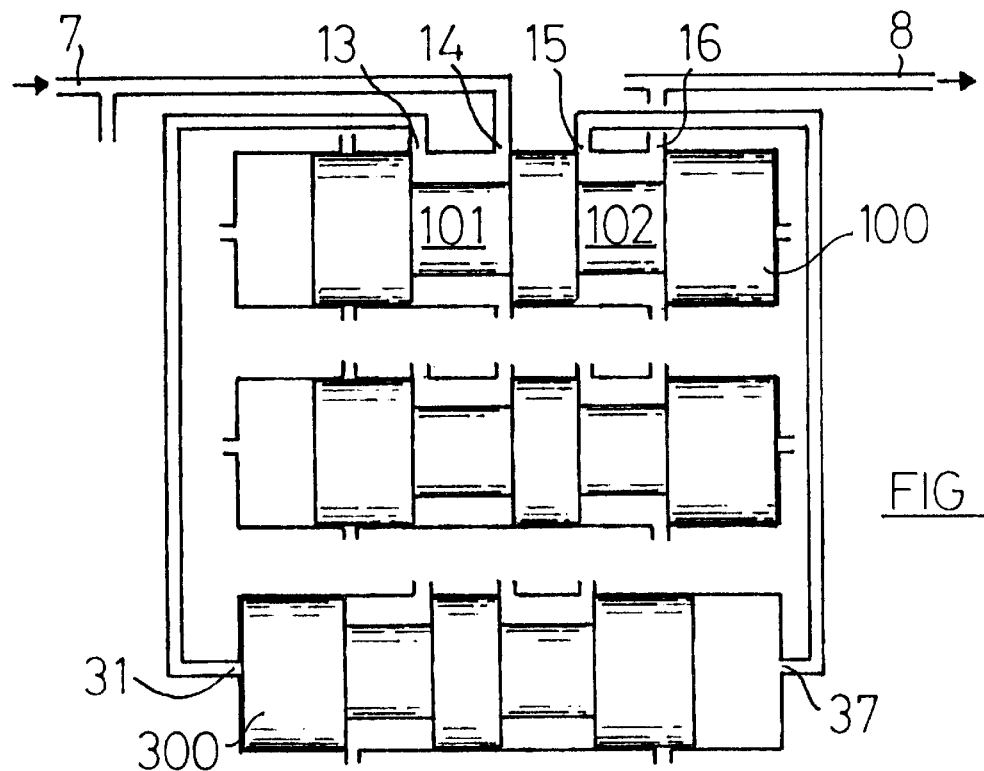
Figure 13:
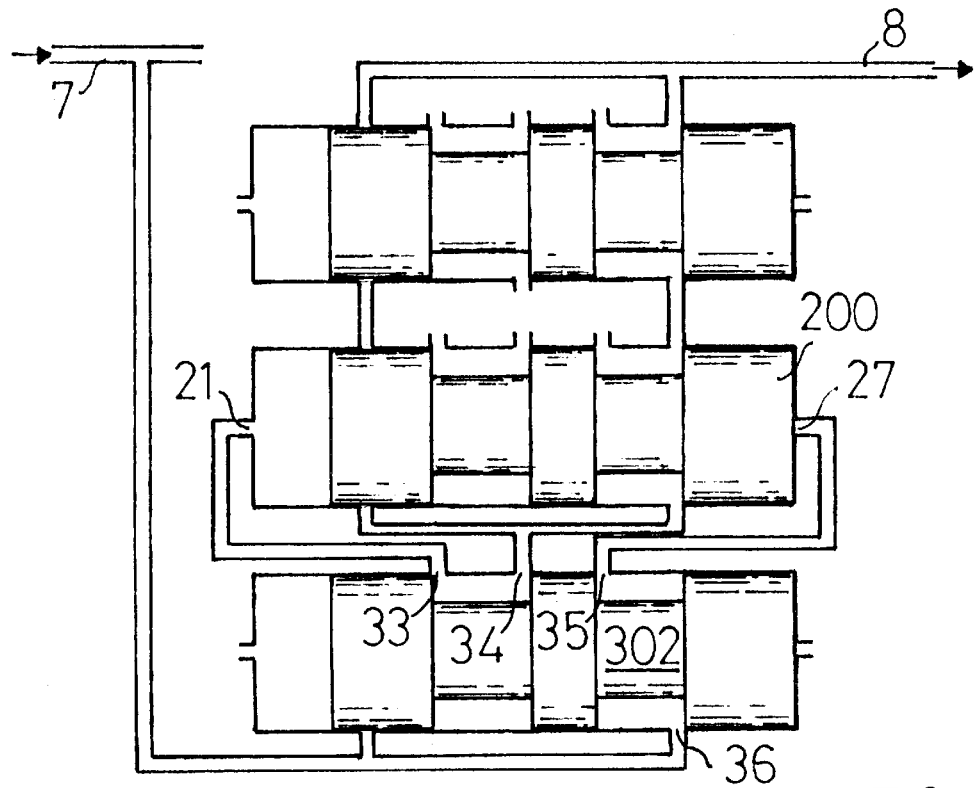

In moving to the FIG. 12 position, the piston 100 has connected ports 13, 14 allowing the inlet flow from port 14 to transfer to the left hand end of cylinder 30 (having first passed along and/or around the piston reduced section part 101), where it passes through port 31 to move the piston 300 to the right i.e. until the pistons have the position shown in FIG. 13.

The fluid displaced from the right hand end of cylinder 30 exits through port 37 and enters cylinder 10 through port 15. This fluid exits cylinder 10 through port 16 and, via passageway 46a (similar to passageway 42a of FIG. 5), passes to outlet channel 8.

In the condition of FIG. 13, each piston 100, 200, 300 is to the right hand end of its respective cylinder as viewed i.e. the end opposite to that of FIG. 10 at presumed cycle start.

Figure 14:
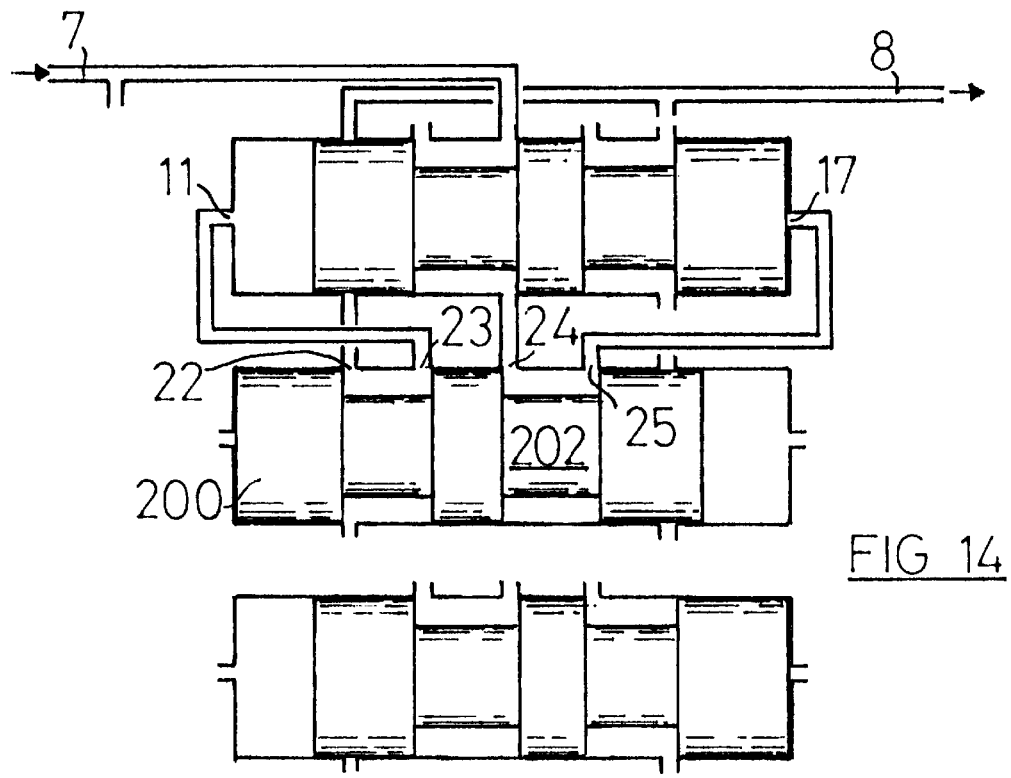

With piston 300 in the FIG. 13 position, the outlet port 34 is uncovered and so the inlet flow can pass by way of port 36 and port 35 (having first passed around and/or along piston reduced section part 302) to the right hand end of cylinder 20, and passes through port 27 to move the piston 200 back to the left, i.e. until the pistons have the position shown in FIG. 14.

The fluid displaced from the left hand end of cylinder 20 exits through port 21 and enters cylinder 30 through port 33. This fluid exits cylinder 30 through port 34, and via the passageways 44c (FIG. 7), passes to outlet channel 8.

Figure 15:
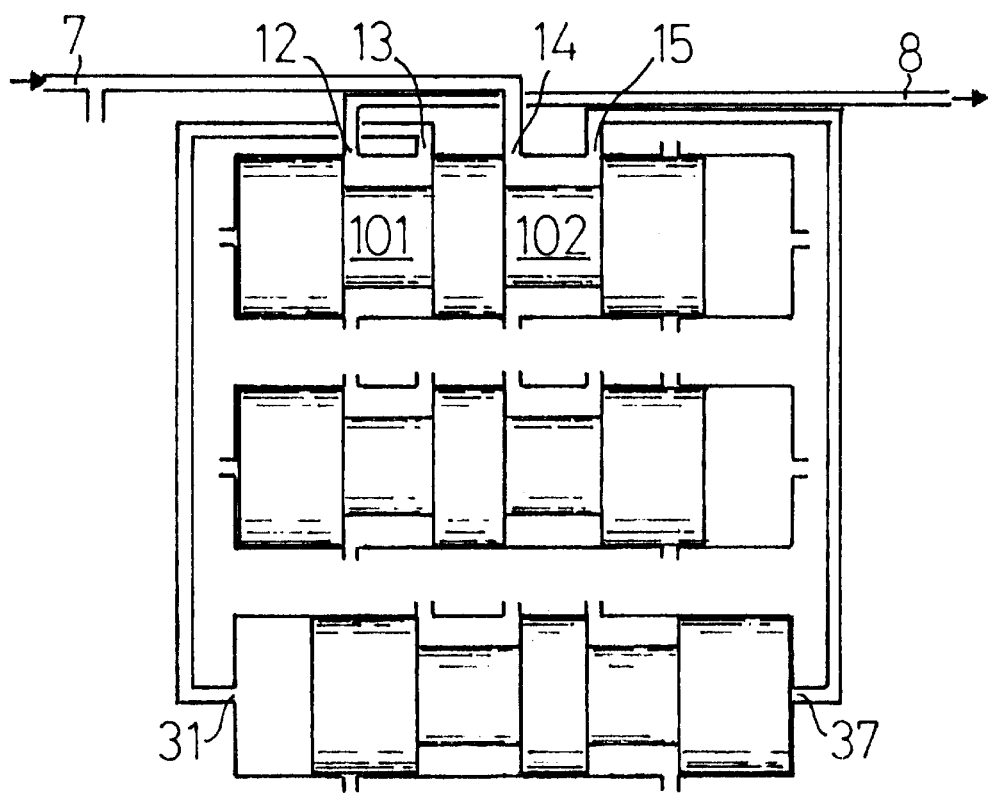

In its left-hand position of FIG. 14, piston 200 permits inlet flow from port 24 to pass through port 25 (having first passed along and/or around piston reduced section part 202) and hence to the right hand end of cylinder 10 through port 17, whereby to move piston 100 to the left hand end of its cylinder 10 i.e. to the position seen in FIG. 15.

The fluid displaced from the left hand end of cylinder 10 exits through port 11 and enters cylinder 20 through port 23. This fluid exits cylinder 20 through port 22, and via the passageway 42b surrounding cylinder 20 (FIG. 5), passes to outlet channel 8.

Finally, when in the FIG. 15 position, the piston 100 permits flow from inlet port 14 to pass to transfer port 15 (having first passed along and/or around piston reduced section part 102) and thus to end port 37 of cylinder 30, to move piston 300 to the left i.e. until it reaches the left hand end of the cylinder 30.

The fluid displaced from the left hand end of cylinder 30 exits through port 31 and enters cylinder 10 through port 13. This fluid exits cylinder 10 through port 12 (having first passed along and/or around the piston reduced section part 101), and passes to outlet channel 8.

Thus, the positions of all three pistons are now as seen in FIG. 16, and this is the same as for FIG. 10 i.e. the cycle is ready to be repeated.

It will be understood that at different piston positions during a cycle, one of the pistons permits water inlet flow to and outlet flow from one or other end of a "neighbour" cylinder. For piston 100 the water flows to or from one or other end of cylinder 30; for piston 200, the water flows to or from one or other end of cylinder 10; for piston 300, the water flows to or from one or other end of cylinder 20.

Each piston in turn, whilst stationary or substantially so, controls flow into and out of another cylinder, with operational movement of the (second) piston in that cylinder from one end to the other; and whilst this is occurring the third piston is at standby, stationary or substantially so.

It will also be understood that, as above described, movement of a piston along a cylinder consequent upon inlet flow causes the expulsion of the fluid in front of that piston. The fluid expelled retraces the first part of its path, travelling back along the respective transfer channel but when it reaches the intermediate transfer port, the movement of the other piston(s) which has occurred in the meantime means that the transfer channel is now in fluid communication with the outlet channel 8.

This flow and ebb of the inlet water, to and from the end spaces of the neighbouring cylinder under the control of a piston as it moves, is repeated in succession during a flow meter cycle, with continuous water flow from inlet channel 7 to outlet channel 8, notwithstanding that the pistons have successive stationary or dwell periods.

The flow meter thus comprises reciprocable pistons, in which one of the pistons is a stationary control piston for another piston, the control piston connecting the inlet and outlet; and in which the said another piston is a movable operating piston adapted to be driven by fluid from the inlet at its one end and to expel fluid to the outlet at its other end. There is also a third piston at standby or waiting to participate; during a flow meter cycle each piston is successively the control piston, the operating piston and the standby piston.

Each piston is dual function, as a positive displacer for metering, and (earlier and later) as a valve member to control flow to and from an adjacent piston, respectively moving and stationary, with also, as above, a stationary non-operating stand-by mode.

One major advantage of the disclosed three-cylinder arrangement is the avoidance of operating piston short-stroking. Clearly for a full operating piston stroke, piston 200 (the current operating piston) must travel from its (left hand) position as shown in FIG. 10 to its (right hand) position of FIG. 11. Piston 200 is so moved because of inlet flow to its port 21 from port 33 of the current control piston 300.

This required full stroking of the current operating piston e.g. 200, is possible notwithstanding probable premature flow between ports 24, 23 due to leakage across the piston 200 central land as it moves rightwards (as viewed), because this premature leakage flow is directed to piston 100 (currently at "standby"). Specifically, as compared to our earlier "two-piston" arrangement this "premature" flow is not directed to the current control piston, since if it were it could move that control piston (to the right) to curtail (prematurely) the "further" inlet flow needed to move the operating piston through its full traverse to the right.

Alternatively stated the piston caused to move prematurely by the leakage across the operating piston land is no longer the piston controlling the flow to the operating piston.

Another major advantage of the three cylinder arrangement is that the cylinder porting and the contained pistons control the flow of fluid from the inlet 2 to the outlet 3 in such manner that reverse flow is substantially prevented i.e. the unit is a combination flow meter and one-way flow valve. This is so whether the reverse flow (assumed to be from outlet channel 8) seeks to move pistons simultaneously, or as is more likely with manufacturing tolerances and differential flow resistances to cause one to move with priority i.e. before the others.

Thus assuming the pistons are in position as seen in FIG. 10 the reverse flow through cylinder 10 moves (priority) piston 300 to the right. Flow though ports 34, 33 then moves piston 200 to the right. Flow through ports 26, 25 then acts to hold piston 100 at its left hand cylinder end, to lock the pistons against further movement.

If the fluid lines are assumed to be of equal flow resistance, without priority piston movement, then alternatively considered in relation to the arrangement of FIG. 8, reverse flow from outlet 3 seeks to enter the flow meter through channel 8, and in the piston positions shown seeks to move pistons 100 and 200 to the right. Piston 100 is permitted only a limited rightwards movement, being arrested as soon as port 24 is closed (since the fluid to the right of the piston 100 is trapped), through piston 100 may have moved sufficiently to block off port 12 from channel 8. Piston 200 can move to its right hand end position.

In its right hand position piston 200 allows a limited flow, which acts to force piston 100 back to the left; with in turn piston 300 being held to the left, and piston 200 being held to the right.

In the arrangement of FIG. 9, starting with each piston at the left hand end of its cylinder, reverse flow from channel 8 holds piston 200 in position; and seeks to move pistons 100 and 300 to the right hand end of their cylinders. Piston 300 however is arrested when port 12 closes, piston 100 moving to the right hand end of its cylinder.

Piston 300 is now forced back to onto its left hand seat, by flow through ports 16 and 15; piston 100 continues to have pressure at its left hand end, and so remains in position.

The number of cycles performed by the pistons can be counted by checking the position or movement of only one piston, at one cylinder location. One suitable sensing means is an infra-red emitter and detector device 51 (FIG. 17), which in this embodiment is made as a plug to fit into the socket 50, but which in an alternative embodiment includes acrylic inserts in the central body part 4.

The device 51 has an emitter 52 with an adjacent detector 53, both being carried in block 54, transparent or significantly so to wavelengths in the infra-red region. Printed circuit board 55 is secured to block 54 and is protected by cover 56. The infra-red beam will be interrupted by the piston projection 57; in an alternative embodiment the emitter and detector are adjacent so that the detector responds to reflected infra-red light (or in the reversed circuitry to its absence).

In a preferred embodiment the infra red beam is pulsed, to reduce power consumption. The duration of dwell of a piston at one end of its cylinder can be calculated for the highest flow rates, and the pulsed rate selected such that the circuitry can readily distinguish between the signal gaps arising from the mark-space pulse pattern and the signal gaps from the interrupting presence of piston projection 57; a suitable ratio for measured pulse gap to distinguish between interruptions in the received signal arising e.g. from piston projection 57, and from the set mark-space ratio, is 10:1.

In an alternative embodiment a piston carries an annular insert inset into its outer periphery and the presence (and absence) of which can be detected by a sensor in or attached to the wall of the central body part 4. This embodiment could have the advantage of a small detection gap. The sensor could be a pyroelectric detector with the piston (preferably without probe) proving the emitter, in that the detector operates in response to temperature changes arising from the alternating presence or absence of water. In further alternative embodiments the presence or absence of the piston can be sensed magnetically (usefully with a Hall effect sensor), or inductively.

The integrated circuit on board 55 is designed in this embodiment to effect sensor driving and detecting, as well as counting, number storage (i.e. completed cycles since last inspection or since initial fitting), and (local) number display; and also drives an output to a remote indicator. Usefully it includes a dedicated lithium battery, for long shelf life and substantially maintenance free service.

In one embodiment each logging pulse is generated by a transistor buffer output stage which is capable if necessary of transmitting the pulse a distance of 0.5 meters. The width of a pulse is conveniently 50 milliseconds. In an alternative arrangement the output signal may utilise more than one pulse for each unit of flow i.e. for each flow meter cycle.

One embodiment of flow meter to meet the aforesaid Class D (British Standard 5728) has the following dimensions (all in centimeters):

| | |
|---|---|
| cylinder axial length | 14.6 |
| end of cylinder to first ports (12,22,32) | 2.8 |
| axial length of first ports | 0.6 |
| end of cylinder to second ports (13,23,33) | 4.8 |
| axial length of second ports | 0.6 |
| end of cylinder to central ports (14,24,34) | 7.1 |
| axial length of central ports | 0.4 |
| piston axial length | 12.6 |
| axial length of end land | 2.8 |
| axial length of central land | 1.8 |
| axial length of reduced section piston part | 2.6 |
| both piston and cylinder axially symmetrical diameter of piston | 2.8 |
| diametral clearance (piston to cylinder) | 0.0075 |

Because the pistons are free floating, with a diametral clearance which with a suitable length overlap (between the piston, and the cylinder wall between any two ports) of 0.08 cm, and a piston of effective diameter of 2.8 cm, there is an acceptable rate of leakage, even with acircular pistons and cylinders; any piston tendency to short stroke (with two-cylinder meters now recognised as a likely consequence of this leakage) is tackled by the provision of the third cylinder as explained above. Furthermore, instead of a piston with an intermediate and two end lands as indicated in the Figures, a piston of uniform cross-section but having three hollow chambers, each with porting for valve control and fluid transfer, can be used.

Figure 18:
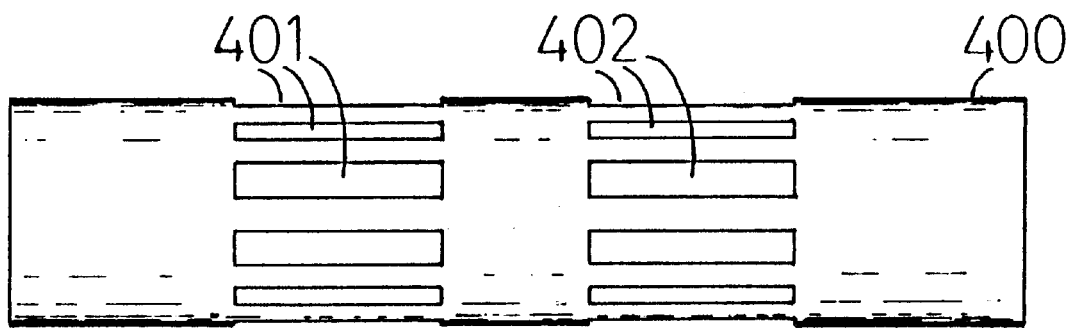
FIG. 18 is a side view of a first alternative piston design.

It will be understood from FIGS. 8 and 10–16 that the flow paths across or past the pistons 100, 200, 300 is by way of the reduced diameter portions 101, 102, 201, 202 and 301, 302 respectively. In a first alternative embodiment shown in FIG. 18, the piston 400 does not have reduced diameter portions, but rather has two sets of apertures 401 and 402, all of apertures 401 being in communication with each other, and all of apertures 402 being in communication with each other, by way of respective hollow interior sections of the piston 400. It is noted for the avoidance of doubt that fluid cannot flow from any of the apertures 401 to any of the apertures 402. The piston 400 may for example be substantially hollow with just a central partition preventing fluid flow between the two sets of apertures.

Whilst the apertures 401, 402 are shown to be rectangular, in practice they can be of any suitable shape, including elliptical or polygonal for example. It is a particular advantage of elliptical apertures that the flow is maximised when the center of the apertures are adjacent the ports, but reduces as the piston moves so that the ends of the apertures are adjacent the ports. It will be understood by those skilled in this art that smoothing the edges of the apertures as much as possible will reduce the pressure drop across the meter.

Figure 19:
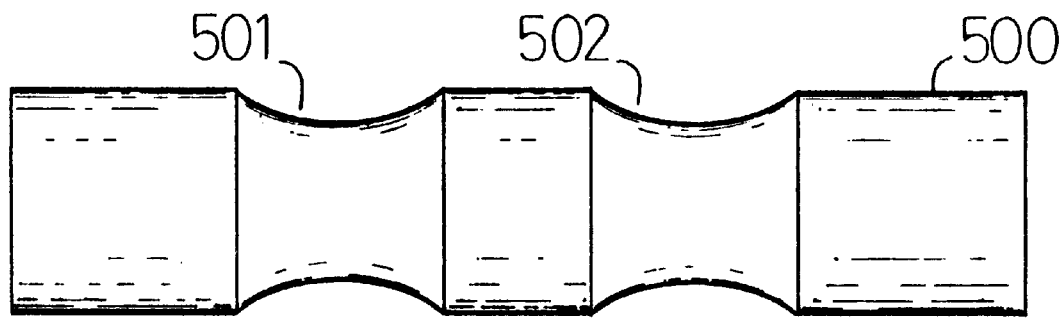
FIG. 19 is a side view of a second alternative piston design.

A second alternative piston 500 is shown in FIG. 19. In this piston, the sharp edges between the lands and reduced diameter portions as in the pistons 100, 200, 300 is replaced by portions of progressively decreasing diameter 501, 502. The provision of such a piston 500 is intended to minimise abrupt changes in the fluid passage areas which will reduce the multiple serial orifice plate effect.

As a further alternative, the piston 400 could be manufactured as an open-ended tube with the apertures 401, 402 formed therethrough. A liner of similar form to the piston 500 of FIG. 19 (but with a correspondingly reduced diameter to be a tight fit within the tube) could be inserted into the tube to provide the barrier between the respective sets of apertures and to close off the ends of the tube. In this alternative, the composite piston would have sets of apertures beneath which were located the liner portions with progressively decreasing diameter similar to the portions 502, 502 of FIG. 19, and such a piston would also have the advantage of minimising abrupt changes in passage area. In addition, such a composite piston would be relatively inexpensive to manufacture.

The length of the "lands" of the pistons 400, 500, as well as the overall length of the piston and its other dimensions, can be matched to those for the piston 100, 200, 300 described above for meet the Class D standard.

What is claimed is:

1. A flow meter having an inlet and an outlet for connection into a fluid line, comprising:
   a first, a second and a third cylinder in the meter,
   a free piston axially movable within each cylinder, the piston being movable by fluid flow from the inlet,
   each cylinder having a plurality of ports, the ports being controlled by the free piston,
   the meter being adapted so that at any time fluid can flow therethrough from the inlet to the outlet by a fluid pathway which includes two of the cylinders,
   two fluid passageways for each cylinder, the two fluid passageways each having one end and another end, wherein the one ends are respectively connected to two of the ports of each cylinder and the another ends are respectively connected to two end parts of another of the cylinders, another port of each cylinder being located between said two of the ports
   the inlet being flow connected to said another port of the first and second cylinders,
   the outlet being flow connected to said another port of the third cylinder.

2. A flow meter according to claim 1 wherein of the three cylinders the two cylinders providing the fluid pathway between the inlet and the outlet change in predetermined succession during a flow meter cycle, wherein the piston in one of said two cylinders is held stationary whilst the piston in the other of said two cylinders is movable whereby the piston in the other of said two cylinders can be driven by inlet fluid at its one end to drive out fluid from its other end, the piston in the other of said two cylinders being connected to drive out fluid from a previous part of the cycle towards the outlet past the piston in said one of the two cylinders.

3. A flow meter according to claim 1 which is adapted to undergo repeated cycles, wherein during each cycle one of the pistons is a stationary control piston for another piston, the control piston being in the fluid pathway connecting the inlet and the outlet, said another piston being a movable operating piston adapted to be driven by fluid from the inlet at its one end and to discharge fluid to the outlet at its other end, the third piston being a stand-by piston, and during a flow meter cycle each piston is successively the control piston, the operating piston and the standby piston.

4. A flow meter according to claim 1 wherein the pistons are double acting, so that the flow meter is self-resetting, for repeated cycling.

5. A flow meter according to claim 1 wherein each piston has a specific gravity selected to provide neutral buoyancy relative to the fluid to be metered and wherein each piston has an outer diameter slightly less than the inner diameter of the cylinder so as to be movable by the fluid between opposite ends of its cylinder without substantial constraint.

6. A flow meter according to claim 1 wherein the cylinders are housed in a three-part body comprising a central body part and two end parts, wherein the cylinders are flow connected by passageways internally of the body, wherein flow passageways are formed in respective end parts, said end part flow passageways providing a hydraulic brake for a piston approaching an end part, and wherein the central body part has an outer wall with flow passageways being formed in said outer wall, said central body part passageways being annular passageways.

7. A flow meter according to claim 1 wherein each of the three cylinders has axially spaced porting, each cylinder containing an axially movable piston controlling interconnection between the porting of its cylinder with that of another cylinder such that the inlet and outlet can have controlled interconnection by said pistons whereby to permit flow from the inlet to the outlet but restricting reverse flow from the outlet to the inlet so that a separate one-way reverse-flow control valve is not needed.

8. A flow meter according to claim 1 which is adapted to undergo repeated cycles wherein at any point during a cycle a first cylinder is an operating cylinder, a second cylinder is a control cylinder, and a third cylinder is a stand-by cylinder, each of the three cylinders having axially spaced porting, each cylinder containing an axially movable piston controlling interconnection between the porting of its cylinder with that of another cylinder, flow of fluid to the operating cylinder occurring between the axially spaced ports of the control cylinder, with a flow path within the control cylinder being provided by a reduced diameter portion of its piston.

9. A flow meter according to claim 8 wherein the ports are located in the walls of each cylinder, the ports of each cylinder being similarly configured, sensing means being provided to check the presence of one of the pistons at a selected end of its cylinder and monitoring means being provided to check and respond to the time interval before said one of the pistons is again at said selected end of that cylinder, the monitoring means including calculator means adapted to convert sensor responses into one of the flow rate or the flow volume of fluid flow through the meter, the sensing means using pulsed signals, the pulsed signals being powered by a dedicated battery and the sensing means being attachable to the flow meter as one of a plug and socket combination.

10. A flow measuring system including a flow meter having an inlet and an outlet respectively connected into a fluid line and comprising three cylinders, each cylinder having a plurality of ports controlled by a free piston axially-movable therein by fluid flow from the inlet and such that at any time fluid can flow through the meter from the inlet to the outlet by a fluid pathway which includes two of the cylinders, two of the ports of each cylinder being flow connected to respective end parts of another of the cylinders, another port of each cylinder being located between said two ports, the inlet being flow connected to said another port of two of the cylinders, the outlet being flow connected to said another port of the third cylinder.

11. A flow measuring system according to claim 10 wherein intermediate flow passageways externally of the cylinders are connected to annularly spaced branches which break through a respective cylinder wall to provide the corresponding flow ports, the ports of each cylinder being axially spaced, the fluid pathway between the ports being by way of the respective piston internally of the cylinder.

12. A flow measuring system according to claim 10 in a fluid conduit, the flow meter including pistons movable within respective cylinders, the cylinders each having an inlet and an outlet port so arranged with respect to the respective pistons that an inlet port and an outlet port are in fluid communication during piston stroking so that flow along the conduit can be continuous, there being three cylinders, an inlet and an outlet port in a cylinder being arranged so that they are in fluid communication by way of the piston in another cylinder, and including means to determine the number of strokes of a piston in a specified time.

13. A flow measuring system for measuring flow along a conduit comprising a piston and cylinder arrangement having first and second and third cylinders and a respective identical piston freely slidable in each respective cylinder, the arrangement having a main inlet and a main outlet for being connected in series with the conduit;

each of the first, second and third cylinders having an inlet port in flow connection with the main inlet, two bi-directional transfer ports such that the bidirectional transfer ports of one cylinder section are in flow connection with end ports in the respective ends of another cylinder, and an outlet port in flow connection with the main outlet;

the first and second cylinders having an inlet port located between the transfer ports, the third cylinder having two inlet ports respectively located between a transfer port and the adjacent end port; each piston having cylindrical end piston portions, a cylindrical intermediate piston portion, and a reduced diameter portion connecting the respective end piston portion to the intermediate piston portion, whereby each piston of said first and second and third cylinder arrangements acts, for its respective cylinder as an operator means that (a) connects the inlet port to one of the transfer ports when the piston is at one end of the cylinder, and (b) connects the inlet port to the other transfer port when the piston is at the other end of the cylinder;

the outlet port of the first and second piston and cylinder arrangements consisting of two outlet ports being alternately open and closed with alternating piston end position of a piston of said first and second piston arrangements;

the transfer ports, the outlet port and the pistons being such as to move in succession each of the three pistons of the first and second and third piston and cylinder arrangement when fluid pressure is supplied to said main inlet; and means for sensing movement of a piston to measure flow of the fluid;

wherein transfer ports of the first cylinder can by way of the first piston alternately connect simultaneously an end port at one end of the third cylinder with the inlet and an end port at the other end of the third cylinder with the outlet, each of these transfer ports therefore accepting bi-directional flow, wherein each piston closes the inlet port or both inlet ports when the piston is at an intermediate position in the cylinder, at least one of the inlet ports of said piston and cylinder arrangements being positioned in the wall of the respective cylinder whereby to be alternatingly opened on respective sides of the intermediate piston portion when the piston is at either end position, each of the bidirectional valve ports in each of the cylinders of said piston and cylinder arrangements being open on respective opposite sides of the respective intermediate piston portion at any position of the respective piston.

14. A flow measuring system according to claim 13 wherein the means for sensing movement of a piston includes a sensor which is in the piston and cylinder arrangement, the sensor being responsive to the position of a piston in its cylinder.

15. A flow measuring system according to claim 13 wherein the means for sensing movement of a piston includes a sensor which is attached to the piston and cylinder arrangement, the sensor being responsive to the position of a piston in its cylinder.

16. A flow meter having an inlet and an outlet for connection into a fluid line, comprising:

a first, a second and a third cylinder in the meter, a free piston axially movable within each cylinder, the free pistons being movable by fluid flow from the inlet, each cylinder having seven ports, wherein two of the ports are end ports located in end parts of each cylinder, wherein five of the ports are side ports located in a sidewall of each cylinder, the side ports comprising an inner side port, two transfer ports and two outer side ports, the transfer ports being located between the outer side ports and the inner side port being located between the transfer ports, whereby fluid flow through said ports is controlled by the free pistons, the flow meter being adapted so that at any time fluid can flow therethrough from the inlet to the outlet by a fluid pathway which includes two of the cylinders, the transfer ports of each cylinder being connected by respective fluid passageways to respective end ports of another of the cylinders, the inlet being connected by a fluid passageway to said inner side port of the first and second cylinders, the outlet being flow connected to the inner side port of the third cylinder.

17. A flow meter according to claim 16 wherein each cylinder and piston is symmetrical, and wherein the inner side port is a central port.

* * * * *